United States Patent
Creamer et al.

(10) Patent No.: US 7,568,190 B2
(45) Date of Patent: Jul. 28, 2009

(54) LATE BINDING OF OPTIMIZATION INFORMATION FOR JUST IN TIME COMPILATION

(75) Inventors: Thomas Edward Creamer, Boca Raton, FL (US); Curtis E. Hrischuk, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 11/074,959

(22) Filed: Mar. 8, 2005

(65) Prior Publication Data

US 2006/0206884 A1 Sep. 14, 2006

(51) Int. Cl.
*G06F 9/45* (2006.01)

(52) U.S. Cl. ........................... 717/148; 717/154
(58) Field of Classification Search .................... None
See application file for complete search history.

(56) References Cited

U.S. PATENT DOCUMENTS

| | | | |
|---|---|---|---|
| 5,995,754 A | 11/1999 | Holzle et al. | |
| 6,118,940 A | 9/2000 | Alexander, III et al. | |
| 6,249,912 B1 * | 6/2001 | Blandy | 717/127 |
| 6,289,506 B1 | 9/2001 | Kwong et al. | |
| 6,321,375 B1 * | 11/2001 | Blandy | 717/127 |
| 6,530,075 B1 * | 3/2003 | Beadle et al. | 717/114 |
| 6,637,025 B1 | 10/2003 | Beadle et al. | |
| 6,671,877 B1 * | 12/2003 | Ogasawara | 717/158 |
| 6,993,755 B1 * | 1/2006 | Ungar | 717/158 |
| 7,089,544 B2 * | 8/2006 | Hickson | 717/148 |
| 7,350,200 B2 * | 3/2008 | Lueh et al. | 717/148 |
| 7,412,693 B2 * | 8/2008 | Mathiske et al. | 717/127 |
| 2004/0143825 A1 | 7/2004 | Hicks | |

OTHER PUBLICATIONS

Suganuma, T., Yasue, T., Kamahito, M., Komatsu, H., Nakatani, T. A Dynamic Optimization Framework for a Java Just-In-Time Compiler, Conference on Object Oriented Programming Systems Languages and ASpplications, pp. 180-195, 2001.*
Arnold, M., Ryder, B. A Framework for Reducing the Cost of Instrumented Code.ACM SIGPLAN Notices, vol. 36 Issue 5 pp. 168-179, 2001.*
Java: Performance Tuning and Memory Management Part 3—Compilers. Retrieved from the Internet: http://tutorials.beginners.co.uk.read/id/215/.

* cited by examiner

*Primary Examiner*—Tuan Q Dam
*Assistant Examiner*—Cheneca P Smith
(74) *Attorney, Agent, or Firm*—Cuenot, Forsythe & Kim, LLC

(57) ABSTRACT

A method of optimizing the runtime performance of a program written in an interpreted programming language can include loading, within a virtual machine having a Just In Time (JIT) compiler, the program and a file specifying frequency of execution data for at least one component of the program. The program can be executed. The executing step can include reading the file specifying the frequency of execution data, seeding a counter of the virtual machine associated with the component(s) with a value derived from the frequency of execution data, and performing a JIT action upon the component(s) of the program according to the seeded counter of the virtual machine.

10 Claims, 1 Drawing Sheet

LATE BINDING OF OPTIMIZATION INFORMATION FOR JUST IN TIME COMPILATION

BACKGROUND

1. Field of the Invention

The present invention relates to computer programming and, more particularly, to more efficiently processing computer programs written in programming languages requiring virtual machines for execution.

2. Description of the Related Art

An interpreted programming language, unlike a compiled language, is converted to machine specific code at runtime through the use of an interpreter program. The interpreter program, also referred to as a virtual machine, interfaces the application written in the interpreted programming language with the target computing platform upon which the application is to be executed. The virtual machine is a software engine that runs on top of the hardware and operating system of the target computing platform. The advantage of using an interpreted programming language is that once an application is written, the application generally can be run on different computing platforms given the existence of a suitable virtual machine for the chosen platform.

JAVA is one example of such a programming language. JAVA source code is compiled to run on a JAVA virtual machine (JVM). Any platform for which a JVM has been implemented can execute JAVA applications. Platform independence is achieved by compiling JAVA source code into a set of one byte digits called "byte code". A byte code may be viewed as a machine code for the JVM, wherein each byte code corresponds to a JVM instruction as defined in the specifications for the JVM. The byte code is platform independent. The JVM acts as an interpreter between the Java byte code and the specific computing platform on which the JAVA program is to execute.

Programs written in interpreted programming languages generally run more slowly than similar programs written in compiled programming languages such as C or C++. In the case of JAVA, for example, the JVM steps through the compiled JAVA program, typically referred to as a JAVA class file, byte code-by-byte code, translating each into native instruction sequences on the fly. This process is slower as compared to executing applications that are compiled and then loaded as a set of native machine instructions.

In order to improve runtime performance of interpreted languages, virtual machines have come to incorporate "Just In Time" (JIT) compilers. A JIT compiler translates certain byte code segments into machine code for the particular hardware platform upon which the virtual machine is implemented. This translation occurs at one time and the block of compiled code is then stored, typically in a non-persistent data store, for later execution. This speeds up execution of the program by avoiding any interpretation phase for frequently executed application components.

One difficulty with JIT compilation is that some run-time execution analysis is required to determine which program components execute frequently and, thus, should be translated into machine specific code. Current solutions utilize virtual machines that are configured to count the number of times a particular component executes and JIT compile components that are executed more times that a threshold number of times. Typically, this threshold, called a JIT threshold, is large, on the order of several thousand.

The threshold is set high enough so that only those methods executed most often are JIT compiled. Such is the case as JIT compiling itself can increase execution time of an application if not used judiciously. In particular, JIT compiling components can require significant computing resources and time. The resulting machine specific code for the component must be executed enough times subsequent to the JIT compilation to overcome the amount of time spent JIT compiling the component(s). Large thresholds help to ensure that this is the case.

While large JIT compilation thresholds may be suitable for long lived applications, such as a server-based applications, short lived applications often see little or no benefit. Short lived applications such as client applications typically are started and terminated over a period of hours and/or days. During such short time periods, it is unlikely that any components will be executed enough to exceed a JIT compilation threshold. Accordingly, it is unlikely that any methods will be JIT compiled.

It would be advantageous to JIT compile selected components of an application written in an interpreted programming language such that execution time is optimized.

SUMMARY OF THE INVENTION

The present invention provides a solution for increasing the performance of a computer program at runtime. One embodiment of the present invention can include a method of optimizing the runtime performance of a program written in an interpreted programming language. The method can include loading, within a virtual machine having a Just In Time (JIT) compiler, the program and a file specifying frequency of execution data for one or more component(s) of the program. The program can be executed, which can include reading the file specifying the frequency of execution data and seeding a counter of the virtual machine associated with the component(s) with a value derived from the frequency of execution data. The executing step further can include performing a JIT action upon the component(s) of the program according to the seeded counter of the virtual machine.

Other embodiments of the present invention can include a machine readable storage being programmed to cause a machine to perform the various steps described herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

Figure 1:
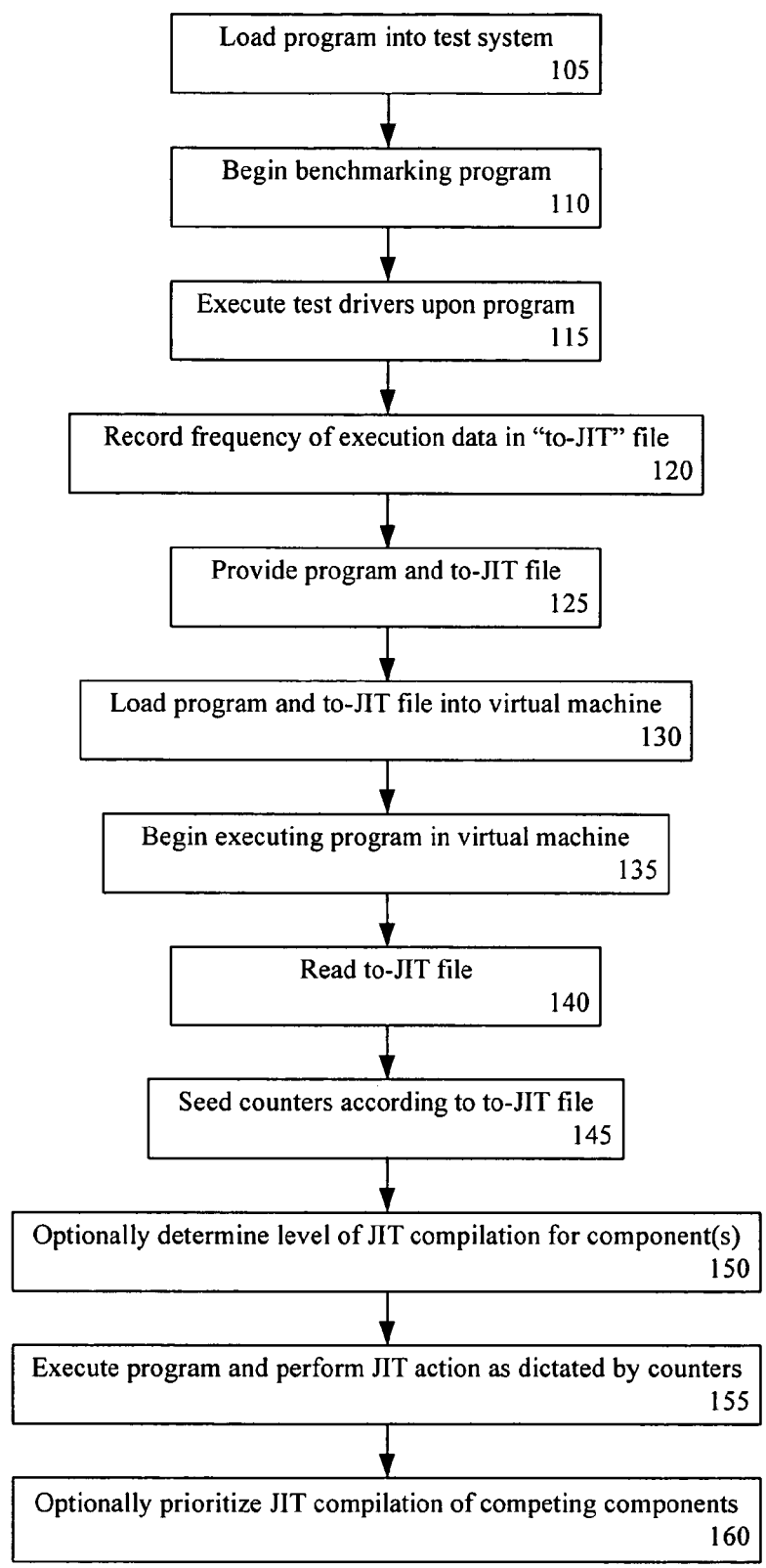
FIG. 1 is a flow chart illustrating a method of optimizing performance of a computer program written in an interpreted programming language in accordance with the inventive arrangements disclosed herein.

The present invention provides a solution for optimizing the execution of computer programs. More particularly, the present invention can decrease the execution time needed for computer programs, or applications, written in an interpreted programming language. In accordance with the present invention, a program written in an interpreted programming language (hereafter "program" or "application") can be benchmarked to select particular components of the program that are executed frequently. From the benchmarking analysis, seed values can be determined for any selected components.

The seed values can be provided along with the program such that when loaded and/or executed by a virtual machine, the seed values are used to seed the counters of the virtual machine. By manipulating the counters, the virtual machine can be made to Just In Time (JIT) compile any selected components of the application. This allows a developer to determine which components should be JIT compiled when the finished program is sent and/or otherwise distributed to a client device or other computer system.

FIG. 1 is a flow chart illustrating a method 100 of optimizing performance of a computer program written in an interpreted programming language in accordance with the inventive arrangements disclosed herein. The method 100 can begin in step 105, where a program, written in an interpreted programming language such as the JAVA programming language, can be loaded into a development environment, benchmarking system, or other test system.

In step 110, benchmarking or testing of the program can begin. The test system can be configured to execute test drivers for different use cases of the program for testing purposes. As known, a use case is a description of program behavior in terms of a sequence of actions in response to some input or action on the part of an actor, whether a human user or another program. Use cases are used to detail system requirements, drive testing, validate models, test user interfaces, and the like. The test system can include test drivers relating to the most frequently performed actions or functions. The particular functions of a program that are considered high use, or key functions, can vary based upon the intended purpose of the application. Still, common examples can include functions such as logging into or out of the application.

In step 115, test drivers can be executed within the test system. In one embodiment, each test driver can be executed a number of times that is greater than or equal to the JIT threshold of a virtual machine. The JIT threshold specifies how many times a given component of a program is to be executed before being JIT compiled within the virtual machine. By executing each test driver at least as many times as the JIT threshold, if not more, any components of the application that are executed at least as many times as specified by the JIT threshold will be JIT compiled during the testing process.

During testing or benchmarking, frequency of execution data can be stored for one or more, or all, components of the program under test in step 120. The frequency of execution data can be stored in a file referred to as a "to-JIT" file. The frequency of execution data can include, but is not limited to, a list of components that were JIT compiled during testing or benchmarking as well as the number of times such components were executed.

While a single to-JIT file can be used with the present invention, in another embodiment, each use case, i.e. test driver, can be associated with a to-JIT file. Accordingly, the present invention is not limited by the number of to-JIT files used. Further, it should be appreciated that any of a variety of different file formats and/or data structures can be used to specify the frequency of execution data for components of the program.

In step 125, the to-JIT file, or files, can be provided with the application after completion of testing and/or benchmarking. In one embodiment, if the application is sent over a communications link, i.e. from a server or other host computer system on the Internet, Web, or other communications network, the to-JIT file(s) can be provided over the communications link with the transmitted program. Notwithstanding, the to-JIT file can be provided with the program in any of a variety of different ways. For example, if the program is provided on a recorded medium, such as a CD or DVD, the to-JIT file can be provided on that medium. The medium can be shipped to customers, shipped to retail outlets, or the like.

Despite the manner in which the program and to-JIT file are provided, the program and to-JIT file can be loaded into a virtual machine for execution in step 130. The virtual machine can execute within a client machine. In one aspect, the virtual machine can be different and remotely located from the test system described herein which performed the benchmarking or testing. In any case, the virtual machine can include a JIT compiler as will be described in further detail.

In step 135, the virtual machine can begin executing the program. In executing the program, the virtual machine can read the to-JIT file in step 140. In step 145, the virtual machine can seed the counters responsible for counting execution of program components at runtime. As components execute within the virtual machine, each component can be associated with a counter responsible for counting the number of times the associated component is executed. The seeding of the counters can be based upon which components have been JIT compiled as specified in the to-JIT file.

In illustration, if the JIT threshold for JIT compiling a component in the virtual machine is 2,000, a counter associated with a component that was JIT compiled during benchmarking, as specified in the to-JIT file, can be seeded to a value of 1,999. Because the to-JIT file specifies frequency of execution data for high execution components, setting the counter to such a value practically ensures that the component will be JIT compiled during execution of the program, i.e. the next time the component is executed.

While a counter, or counters as the case may be, can be seeded to any value, in one embodiment, counters can be seeded to a value just below the JIT threshold value. In another embodiment, the seed value can be derived from the number of times the component was executed as specified in the to-JIT file. In that case, the more a JIT compiled component was executed during testing, as specified by the to-JIT file, the higher the seed value used for seeding the counter of that component at runtime.

Some JIT compilers provide multiple levels of JIT compilation, with each level implementing more, or more extensive, code optimization techniques. The higher the frequency of execution of a component, the higher the level of JIT compilation used on the component. An example of such a compiler is the JIT compiler available from International Business Machines Corporation of Armonk, N.Y. Accordingly, in another embodiment, when using a multi-level compiler, the number of times a component is executed can be used to select a particular level of JIT compilation.

Thus, in step 150, the number of times each component is executed during the testing process optionally can be used by the virtual machine, or JIT compiler, to select a level of JIT compilation. In one embodiment, the level of JIT compilation can be determined from the counter, and thus the seed value. That is, a counter value of 1,000, for example, can indicate that level 1 JIT compilation is to be used. A counter value of 1,500 can indicate that level 2 JIT compilation is to be used, etc. By seeding the counter to a predetermined number, a particular JIT compilation level can be selected for a component. In step 155, the virtual machine can execute the program and perform a JIT action such as JIT compiling any components as may be required in accordance with the counters, whether seeded or unseeded.

In step 160, if the frequency of execution data specifies the number of times a particular component was executed during benchmarking, such information can be used to prioritize JIT compilation of competing components. Competing components can refer to two or more components having counters that indicate at runtime, and at approximately the same time, that the two or more components are to be JIT compiled. For example, the counters can have the same value, each crossing the JIT compilation threshold at approximately the same time or in such close temporal proximity with one another that the JIT compilation of one component must wait for a prior JIT compilation to finish. In such cases, the number of times each competing component was executed during benchmarking can be used to determine a priority, or ordering, among the components to be JIT compiled. Accordingly, a component that was executed, for example 1,500 times, can be selected for JIT compilation prior to a component that was executed 1,501 times during benchmarking, despite both potentially having a same counter value, due to seeding, at runtime.

In another embodiment of the present invention, machine specific code derived from components that were JIT compiled during benchmarking can be stored for later use. In such an embodiment, the machine specific code can be provided along with the application and to-JIT file in step 125 if so desired. In that case, rather than JIT compiling the components when indicated by the counters, another JIT action can be performed. The machine specific code for such a component that is to be JIT compiled can be accessed locally. Thus, the machine specific code for such components is accessed and executed without performing any JIT compilation on the component. It should be appreciated that such an embodiment also can be used in conjunction with JIT compiling at runtime such that selected components are JIT compiled at runtime and others are provided with corresponding machine specific code.

The present invention provides a solution for increasing the runtime efficiency of a program written in an interpreted language, such as JAVA or any other language requiring a virtual machine or software interpreter for execution. In accordance with the inventive arrangements disclosed herein, benchmarking can be performed to determine frequently executed components of an application. Data from the benchmarking tests can be provided with the application to a virtual machine, for example within a client device. Upon execution of the program, the data from the benchmarking tests can be used to seed counters within the virtual machine to prompt JIT compiling of selected components, thereby allowing any application written in an interpreted language to benefit from JIT compilation techniques.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, software application, or other variants of these terms, in the present context, means any expression, in any language, code, or notation, of a set of instructions intended to cause a system having an information processing capability to perform a particular function either directly or after either or both of the following: a) conversion to another language, code, or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of optimizing runtime performance of a program written in an interpreted programming language, said method comprising:

loading, within a virtual machine having a Just In Time (JIT) compiler, the program and a file specifying frequency of execution data for at least one component of the program determined from at least one prior execution of the program;

executing the program comprising:

reading the file specifying the frequency of execution data;

seeding a counter maintained by the virtual machine that specifies a number of times at least one component of the program has been executed in the current execution of the program with a value derived from the frequency of execution data that is greater than a number of times the at least one component has executed in the current execution of the program; and performing a JIT action upon the at least one component of the program according to a comparison of the seeded counter of the virtual machine and a threshold maintained by the virtual machine indicating a number of executions of a component required before the JIT action is performed upon the component, wherein the at least one component of the program is the subject of the JIT action in fewer executions than specified by the threshold in consequence of the seeding.

2. The method of claim 1, wherein the file specifies frequency of execution data for a plurality of components and the frequency of execution data specifies a number of times each of the plurality of components was executed during benchmark testing.

3. The method of claim 2, further comprising:

determining a priority for JIT compiling at least two of the plurality of components at runtime that have been selected for JIT compilation within a predetermined period of time of one another according to the number of times each of the at least two of the plurality of components was executed during benchmark testing; and JIT compiling one of the at least two components having the highest priority prior to the other of the at least two components.

4. The method of claim 1, said step of performing a JIT action comprising JIT compiling the at least one component of the program into machine specific code as determined by the seeded counter.

5. The method of claim 4, further comprising storing the machine specific code in a persistent data store for at least one subsequent execution of the program.

6. The method of claim 4, further comprising selecting a level of JIT compilation from a plurality of levels of JIT compilation to be used for JIT compiling the at least one component within the JIT compiler according to the frequency of execution data such that said step of JIT compiling the at least one component functions at the selected level, wherein different ones of the plurality of levels of JIT compilation implement different code optimization techniques.

7. The method of claim 1, wherein the virtual machine is disposed in a client information processing system.

8. The method of claim 1, said loading step further comprising loading machine specific code for the at least one component of the program that is provided with the program and exists prior to the current execution of the program.

9. The method of claim 8, said step of performing a JIT further comprising: determining that the seeded counter associated with the at least one component indicates JIT compilation is to be performed;
    determining that machine specific code has been loaded for the at least one component; and
    executing the machine specific code corresponding to the at least one component in lieu of JIT compiling the at least one component at runtime.

10. The method of claim 1, said executing step further comprising:
    dynamically determining a frequency of execution for the at least one component of the program at runtime; and
    dynamically adjusting a seed value written to the counter according to the frequency of execution of the at least one component, wherein the counter is seeded with a value that is greater than a number of times the at least one component has executed in the current execution of the program.

* * * * *